(12) United States Patent
Nandi et al.

(10) Patent No.: US 11,610,248 B1
(45) Date of Patent: Mar. 21, 2023

(54) TYPE AMBIGUITY DETECTION SYSTEM

(71) Applicant: Amazon Technologies, Inc., Seattle, WA (US)

(72) Inventors: Subhrangshu Nandi, Seattle, WA (US); Emilio Ian Maldonado, Bothel, WA (US); Alexey Korobko, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 842 days.

(21) Appl. No.: 16/446,537

(22) Filed: Jun. 19, 2019

(51) Int. Cl.
- *G06Q 30/00* (2012.01)
- *G06Q 30/0601* (2023.01)
- *G06F 17/16* (2006.01)
- *G06K 9/62* (2022.01)

(52) U.S. Cl.
CPC ......... *G06Q 30/0631* (2013.01); *G06F 17/16* (2013.01); *G06K 9/6256* (2013.01); *G06K 9/6282* (2013.01); *G06Q 30/0641* (2013.01)

(58) Field of Classification Search
CPC G06Q 30/0631; G06Q 30/0641; G06F 17/16; G06K 9/6256; G06K 9/6282
USPC ...................................................... 705/26, 27
See application file for complete search history.

(56) References Cited

U.S. PATENT DOCUMENTS

| | | | | |
|---|---|---|---|---|
| 7,870,039 B1* | 1/2011 | Dom | ................. | G06Q 30/0623 705/26.61 |
| 10,558,921 B2* | 2/2020 | Jayaraman | ............ | G06F 16/285 |
| 2006/0120609 A1* | 6/2006 | Ivanov | ................... | G06V 20/40 382/190 |
| 2007/0124300 A1* | 5/2007 | Bent | ....................... | G06N 5/04 707/999.005 |
| 2008/0154807 A1* | 6/2008 | Chow | .................. | G06K 9/6253 706/12 |
| 2016/0026723 A1* | 1/2016 | Subasic | ................. | G06F 16/335 707/740 |
| 2018/0322418 A1* | 11/2018 | Jayaraman | .............. | G06F 40/40 |
| 2020/0074306 A1* | 3/2020 | Giral | ...................... | G06N 20/20 |
| 2021/0117948 A1* | 4/2021 | Voss | .......................... | G06N 3/08 |

OTHER PUBLICATIONS

Bednar et al.1984. Alpha-trimmed means and their relationship to median filters. IEEE Transactions on acoustics, speech, and signal processing, 32(1), 145-153.

(Continued)

*Primary Examiner* — Robert M Pond
(74) *Attorney, Agent, or Firm* — Knobbe, Martens, Olson & Bear LLP (57) ABSTRACT

Type ambiguity detection methods and systems are provided to predict a browse node classification for items in an electronic catalog and determine ambiguity between browse nodes based at least partly on the predicted browse node classifications for the items. For example, the type ambiguity detection system may identify a plurality of search queries previously submitted by users of the electronic catalog, determine a plurality of browse nodes that are frequently selected after submitting the search queries, determine items that consumers frequently view or purchase in connection with the search queries, input the items into a classifier, receive an output predicting a proper item type or browse node for a given item, and initiate an action in response to determining ambiguity.

20 Claims, 6 Drawing Sheets

(56) References Cited

OTHER PUBLICATIONS

Chakraborty et al. 2014. On data depth in infinite dimensional spaces. Annals of the Institute of Statistical Mathematics.
Chen et al. 2016. Xgboost: A scalable tree boosting system. pp. 785-794 of: Proceedings of the 22nd ACM.
Febrero-Bande et al. 2012. Statistical computing in functional data analysis: The R package fda.usc. Journal of statistical Software, 51(4), 1-28.
Kenter et al. 2015. Short text similarity with word embeddings. pp. 1411-1420 of: Proceedings of the 24th ACM international on conference on information and knowledge management. ACM.
Mihalcea et al. 2006. Corpus-based and knowledge-based Measures of text Semantic Similarity. pp. 775-780 of: AAAI, vol. 6.
Pennington et al. 2014. GloVe: Global Vectors for Word Representation. pp. 1532-1543 of: Proceedings of the 2014 conference on empirical methods in natural language processing (EMNLP).
Radovanović et al. 2009. Nearest neighbors in High-Dimensional data: The Emergence and Influence of Hubs. pp. 865-872 of: Proceedings of the $26^{th}$ Annual International Conference on Machine Learning. ACM.
Visa et al., Confusion Matrix-based Feature Selection. Proceedings of the Twenty-second Midwest Artificial Intelligence and Cognitive Science Conference, Omnipress, 2011.

\* cited by examiner

TYPE AMBIGUITY DETECTION SYSTEM

BACKGROUND

An online store may be interested in properly labeling an item in the store. For example, a local retailer may upload a new item listing for an online store and choose one or more labels, search terms, or item categories to associate with the new item. Items may often fall into multiple categories, so it may be possible for similar items to be associated with multiple distinct labels, types, or categories. A user may therefore experience frustration when trying to label an item or search for the item because the item may not be labeled according to the user's expectations. Because users may constantly produce and list on the online store every day, it would be prohibitively expensive in terms of labor, time, and cost to check if every single item is associated with an intuitive and unambiguous item category. It is therefore desirable to teach a computing system to recognize potentially ambiguous labeling and take action to rectify the ambiguity.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Aspects of the present disclosure relate to utilizing machine learning techniques to recognize ambiguity in existing item categories, nodes, or types and to take an action upon recognizing the ambiguity. Detecting and addressing item type ambiguity given a searchable domain of items, item types, categories, and labels may be accomplished in different manners, such as using different algorithms, different machine learning techniques, and/or different searching methodologies, as will be further described below.

As will be described herein, a type ambiguity detection system may identify a plurality of related search queries previously submitted by users in an electronic catalog who provided user consent for their search queries to be used for purposes described herein, determine a plurality of browse nodes that have been selected or purchased after submitting the search queries, examine user behavior after submitting the search queries to identify a set of items, and identify one or more items for each browse node. The type ambiguity detection system may then predict a browse node classification for each item, generate a confusion matrix, estimate an ambiguity level between a first node and a second node, and initiate an action in response to detecting ambiguity. As will further be discussed below, the type ambiguity detection system may divide the method and processes among various modules or system components.

The task of detecting ambiguity in item categories according to previously used methods typically involves hiring a taxonomist to manually compare each individual item category or label in the electronic catalog. While this approach may successfully identify potentially ambiguous item categories that may lead to customer confusion (e.g., fitness trackers in a Sporting Goods category versus heart rate monitors in a Health category), such a method becomes increasingly inefficient and costly as the size of the electronic catalog increases day by day. Ambiguity in the electronic catalog is further compounded by the fact that any given item in the electronic catalog may have multiple uses that may not necessarily be contemplated by the taxonomist (e.g., a fashionable tote bag may be used by some people as a simple shopping bag). Furthermore, a taxonomist's view on ambiguity may not necessarily align with what the general public may find confusing. For example, while an experienced taxonomist may understand the differences between "women's shoulder handbags" listed under a "US Fashion" category versus "women's cross-body handbags" listed under a "US Sporting Goods" category, many customers may nonetheless have difficulty deciding which item category to look at when searching for a particular women's bag.

Because taxonomists may have difficulty deciding the best browse nodes for each item, traditional machine learning-based classification systems may also suffer in accuracy because the training data itself may be inappropriately labeled by taxonomists. In view of the above issues and the fact that there is currently no mechanism to quantify ambiguity in a large electronic catalog, it is desirable for a system to be configured to reliably and quickly identify ambiguity among item categories or nodes and alert an administrative user or take an appropriate automated action to remedy the ambiguity.

Furthermore, the act of properly categorizing an item may prove difficult to sellers as well as ordinary customers. Typically, a seller may upload images and textual descriptions of an item for sale on an electronic store. The seller may also be asked to choose an existing category, department, or label to apply to an item so that the item appears in relevant search results. However, even a seller may find it difficult to choose a particular category or subcategory, especially if multiple subcategories appear similar but are branches of different categories (e.g., a "women's leggings" subcategory may appear in both a "Women's Clothing" category and a "Sports and Fitness" category). A seller may place an item under one category but may have meant a different category, or the seller may place duplicate item listings in all potentially relevant categories. Seller confusion in the initial categorization process may ultimately lead to customer confusion as described above. Thus, a healthy online store requires a way to detect and remedy ambiguity to provide for a frustration-free user experience for both customers and sellers. Although an electronic or online store may be configured to facilitate the purchase of goods on a website using text-based search queries, it will be appreciated that other possibilities exist in other embodiments. For example, in some embodiments, an online or electronic store may be a collection of network-accessible services executed on computer hardware that provides multiple channels through which customers can access electronic catalogs stored in databases to find various available products and services. For example, an online store may be accessible via a mobile application on a handheld user computing device and may allow voice-based search queries to discover products or services relevant to a received audio query from a user computing device or smart speaker.

Methods and systems disclosed herein address these problems, allowing a system to use machine learning to automatically detect ambiguous browse nodes by examining customer actions on the electronic catalog. For example, in some embodiments described herein, a type ambiguity detection system may identify a plurality of search queries previously submitted by users of the electronic catalog (who provided user consent for their search queries to be used for purposes described herein), determine a plurality of browse nodes that are frequently selected after submitting the search queries, determine items that consumers frequently view or purchase in connection with the search queries, input the items into a classifier, and receive an output predicting a proper item type or browse node for a given item. The extent to which items in one of two different browse nodes are classified by the classifier as belonging to the other of the two nodes, and vice versa, may be a basis for identifying ambiguity between the two nodes. The type ambiguity detection system may also transmit a notification regarding the ambiguity to a user or may automatically take action to remedy the ambiguity.

There are many technical and practical benefits to utilizing the type ambiguity detection system and methods described herein. By leveraging recorded consumer behavior with respect to an electronic catalog, the type ambiguity detection method described herein may pinpoint specific browse nodes that have commonly caused actual confusion to consumers rather than iterating through each and every possible item and browse node in the electronic catalog. For example, it would be prohibitively costly to examine customer behavior for each and every item associated with an item type or category. Rather, by examining only the items or browse nodes that are frequently selected after a user submits a search query associated with an item type, the type ambiguity detection system may narrow the problem space and examine the browse nodes or items with the most search or purchase activity. In contrast, other methods may need to manually iterate through all possible items and item types. By reducing the problem size in view of historical consumer behavior and quantifying ambiguity, the techniques described herein significantly reduce the inefficiencies of various types of ambiguity detection (including ambiguity detection in a network-based retail environment), allowing users to detect ambiguity in an methodical and scalable way.

Figure 1:
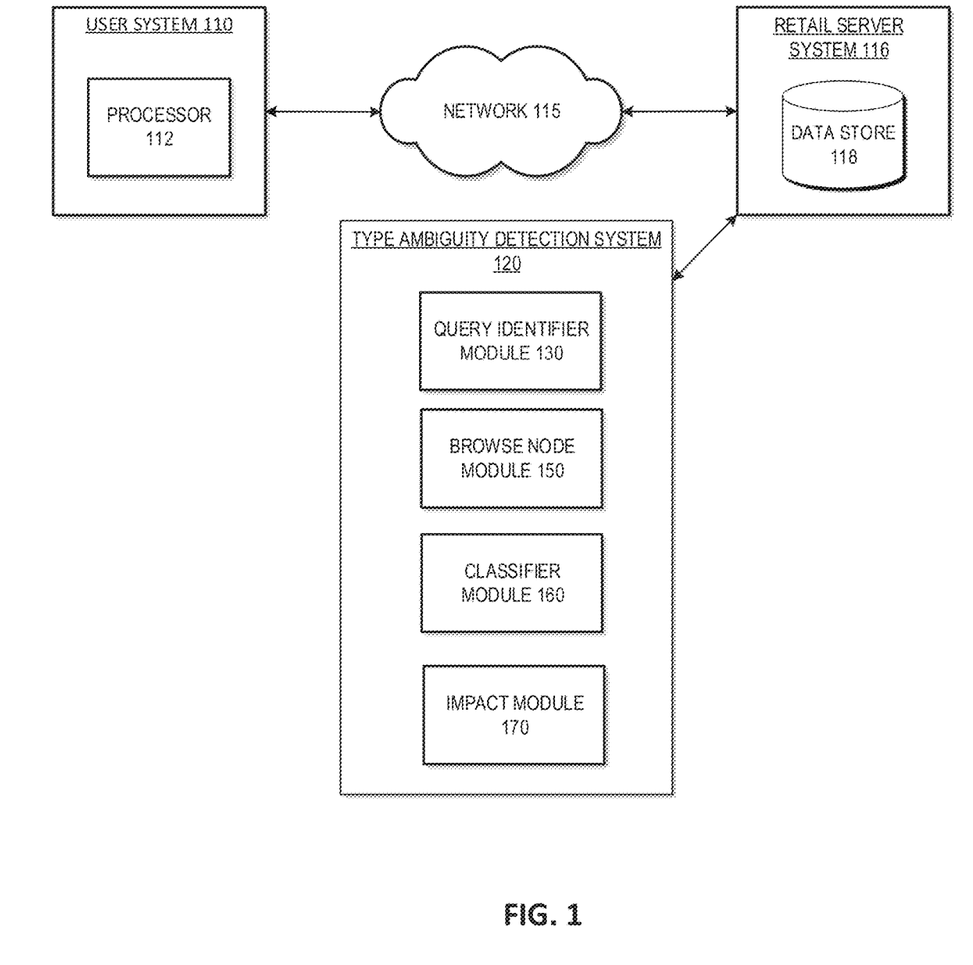
FIG. 1 is an illustrative networked environment and system architecture of a type ambiguity detection system, according to some embodiments.

FIG. 1 is an illustrative networked environment and system architecture of a type ambiguity detection system, according to some embodiments. The illustrative environment includes a user system 110, a network 115, a type ambiguity detection system 120, and a retail server system 116. In some embodiments, user system 110 may be a computer, handheld mobile computing device, or other computing system. In some embodiments, a number of computing systems may each be used by a number of different users to submit user input queries to retail server system 116. In some embodiments, the user system 110 may utilize processor 112 to generate a user interface and execute user inputs to interact with retail server system 116. In some embodiments, user search queries submitted from user system 110 may be transmitted remotely to retail server system 116 over network 115. In some embodiments, retail server system 116 may process user search queries and output a search results in response to a user search query. In some embodiments, retail server system 116 may store a log of user search queries, navigation paths, clicks, and purchases in data store 118. For example, in some embodiments, retail server system 116 may be a cloud storage system associated with an online retail service for storing or backing up data securely on a remote server. In some embodiments, data store 118 may also comprise entries representing item categories, item subcategories or browse nodes, and items.

In some embodiments, type ambiguity detection system 120 may be in communication with retail server system 116 to perform ambiguity detection on browse nodes stored in data store 118. After retail server system 116 has received and stored historical user data (e.g., search histories, browse histories, purchase histories, and/or other behavioral and/or clickstream data) in data store 118, the type ambiguity detection system 120 may utilize query identifier module 130 to identify search queries to use for disambiguating browse nodes. As will be discussed later, in some embodiments the query identifier module 130 may track how frequently a term has appeared in previously submitted search queries and which item type, label, or item category is mapped to the term in the electronic catalog. For example, a search query of "batteries" may be associated with an item type "Electronics" or the item type "Household Products." In other embodiments, the type ambiguity detection system may begin the disambiguation method by starting with a particular item type or category. For example, given an item type "Electronics," the type ambiguity detection system may examine historical logs stored in data store 118 and determine that "batteries" is the most popular search query associated with the given item category or type.

Once the query identifier module 130 identifies one or more popular search queries associated with an item type or category, the browse node module 150 may determine a set of two or more browse nodes or item subcategories. The browse nodes may be determined by examining consumer actions after a particular search query is submitted. For example, historical records may indicate that all consumers selected either the browse node "Women's Clothing" or the browse node "Women's Sportswear" after submitting a search query for "women's leggings." In some embodiments, the browse node module 150 may determine browse nodes by simply including browse nodes associated with a given item category. For example, in an electronic catalog that places items in a hierarchical order (e.g., the item "leggings" may be placed under a browse node "Women's Clothing" which itself may be placed under the broad category of "Clothing," such as in a tree structure). Given a broad category of "Clothing," the type ambiguity detection system may include all subcategories or browse nodes ordered under the broad "Clothing" category. In some embodiments, the plurality of browse nodes may comprise browse nodes in associated with a given item category as well as browse nodes that have been previously selected by users after submitting a search query associated with the given item category.

For example, the type ambiguity detection system may determine that the plurality of browse nodes include all browse nodes under the category "Clothing" but may also include browse nodes under a different category (e.g., a "yoga pants" browse node under "Sports and Fitness" category) if users have previously clicked on a different browse node or have purchased items belonging to a particular browse node after submitting a particular search query. Therefore, in some embodiments, the determined browse nodes may comprise browse nodes spanning across multiple categories. The type ambiguity detection system may also identify all browse nodes customers end up purchasing subsequent to submitting the given search query. As will be discussed later, in some embodiments, the type ambiguity detection system may do so by utilizing an affinity score. Furthermore, in some embodiments, the browse node module 150 may obtain a list of items associated with the determined browse nodes. For example, the browse node module may examine historical data to obtain the most viewed items or products in a particular browse node. By way of example, browse node module may obtain the item "High waist yoga pants" because that particular item was commonly purchased by users who selected a "Women's clothing" browse node and originally searched for "women's leggings."

The classifier module 160 may generate and train a classifier to perform type ambiguity detection. In some embodiments, the classifier module 160 may generate a gradient boosted decision tree (GBDT) based classifier to build a multi-class classifier. In some embodiments, the classifier module 160 may utilize other classifiers. For example, the classifier module 160 may utilize neural network models or deep learning classifiers to classify an item to a browse node. In some embodiments, the generated classifier may take as input an individual item and classes or browse nodes in which to classify the item. In some embodiments, the input item may first be transformed into a representative vector. For example, in some embodiments, the classifier module may generate a representative vector for an item using average Global Vectors (GloVe) embedding of the text associated with the item, such as titles, bullet points, and descriptions. It will be appreciated that in some embodiments, other algorithms may be used to obtain vector representations for words (e.g., word2vec algorithm).

In some embodiments, the classifier may be tuned to achieve a certain level of performance. For example, in one embodiment, GBDT hyper-parameters (e.g., maximum depth of a tree, maximum number of terminal nodes in a tree) may be tuned using 10-fold cross validation with area under curve (AUC) as the evaluation criterion. In some embodiments, the classifier may then compute a prediction score of each product identified by the browse node module 150 for each class or browse node determined by the browse node module 150. In some embodiments, the prediction score of an item belonging to a certain class may be predicted by utilizing arguments of a maxima function. For example, for an item $s_i$, the predicted class of the item $s_i$ may be represented as $bn^* = \arg\max_j p_{ij}$, where $p_{ij}$ is the prediction score representing the probability that the item $s_i$ belongs to browse node $b_{nj}$. The GBDT may be trimmed to reduce the overall size and complexity of the model. For example, the type ambiguity detection system may compute a probability threshold for alpha-trimming and remove an item from the identified set of items if the probability of that item belonging to a particular class is below a predetermined threshold (e.g., 0.05 on a scale of 0 to 1). Therefore, a new set of items to be used in the type ambiguity detection system may include only the items associated with a probability score exceeding the predetermined threshold, and the classifier may be retrained using the new set of items. In some embodiments, the type ambiguity detection system may then refit the GBDT classifier with the new set of items on the same classes or browse nodes previously identified by the browse node module 150.

In some embodiments, the classifier module 160 may compute a confusion matrix to evaluate the prediction results of the GBDT classifier. In some embodiments, the type ambiguity detection system may compute a confusion matrix:

$$\begin{array}{c} \phantom{bn_1} \begin{array}{cccc} bn_1 & bn_2 & \ldots & bn_n \end{array} \\ \begin{array}{c} bn_1 \\ bn_2 \\ \vdots \\ bn_n \end{array} \left( \begin{array}{cccc} x_{11} & x_{21} & \ldots & x_{n1} \\ x_{12} & x_{22} & \ldots & x_{n2} \\ \vdots & \vdots & \ddots & \vdots \\ x_{1n} & x_{2n} & \ldots & x_{nn} \end{array} \right) \end{array}$$

where $x_{ij}$ is the number of samples or items belonging to browse node $bn_i$ but predicted to be in browse node $bn_j$. The classifier module 160 may use the entries of the confusion matrix to calculate ambiguity between two browse nodes. For example, in some embodiments the ambiguity between browse node $bn_p$ and $bn_q$ may be defined as:

$$\lambda_{pq} = + \frac{x_{pq} + x_{qp}}{x_p + x_q}$$

where $x_{pq}$ represents the number of items belonging to browse node p but predicted to be in browse node q, $x_{qp}$ represents the number of items belonging to browse node q but predicted to be in browse node p, $x_p$ represents the number of items in node p, and $x_q$ represents the number of items belonging in node q. In some embodiments, $\lambda_{pq}$ may be a value between 0 and 1, where higher values of $\lambda_{pq}$ may denote higher ambiguity between browse node p and browse node q. Advantageously, computing the ambiguity between browse nodes may in turn lead to a determination of overall ambiguity of the item type, category, or concept associated with the browse nodes. For example, if two browse nodes (e.g., "sweaters" and "shirts") are determined to have a high ambiguity score (e.g., 0.9 on a scale from 0 to 1), associated with a broader item category (e.g., "Clothes"), then it may be determined that the item category itself is ambiguous, especially if the number of items in the ambiguous browse nodes is large.

Impact module 170 may execute commands or cause an automated responsive action to be performed when the classifier module 160 detects ambiguity among browse nodes or item categories. In some embodiments, impact module 170 may generate an alert, push notification, text message, email notification, or other notification and transmit the notification to an administrator user of the retail server system 116. In some embodiments, the notification may include a recommendation to take an action. For example, a notification may recommend that the administrator merge two browse nodes associated with an item category together because the two browse nodes are associated with a high pairwise ambiguity score. In some embodiments, the impact module 170 may recommend that the administrator user move a particular browse node in the electronic catalog. In some embodiments, the impact module may automatically take action if an ambiguous pair of browse nodes is detected. For example, the impact module 170 may automatically merge two ambiguous nodes together in the electronic catalog, which may include aliasing one node in a second location in browse tree.

It will be appreciated that ambiguity detection features described herein may be implemented in a number of different environments than the one illustrated in FIG. 1. For example, modules illustrated as part of type ambiguity detection system 120 could instead be included within a computing system, such as retail server system 116, such that the retail server system 116 may detect ambiguity in the electronic catalog as described herein without network accessibility or any external ambiguity detection system. Similarly, modules illustrated as part of type ambiguity detection system 120 could instead be included within a variety of servers, network-accessible services or other systems that provide a variety of features in order to incorporate improved ambiguity detection functionality with such features.

Figure 2:
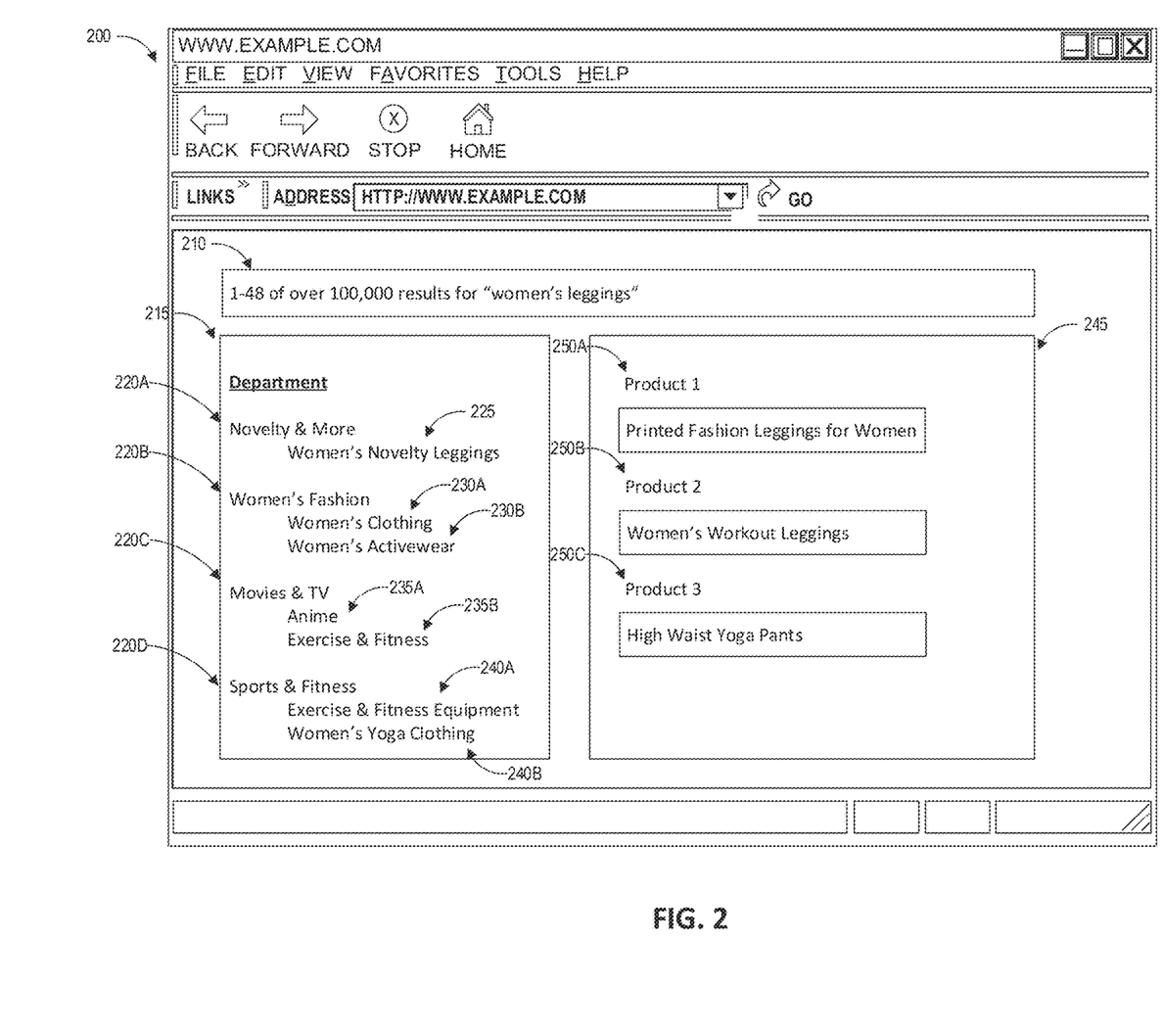
FIG. 2 is an example user interface displaying the results of a search query from a user's perspective.

FIG. 2 is a visual representation depicting an example user interface a user may encounter when interacting with an electronic catalog. User interface 200 depicts a webpage that may appear on a display device of user system 110, and may have been generated by the retail server system 116. User interface 200 may comprise a search bar 210 which may allow users to provide user input. For example, search bar 210 may receive as input a search query comprising keywords and then display a result of the inputted search query. Portion 245 of user interface 200 may comprise a list of results responsive to the inputted search query in search bar 210. For example, user interface 200 may display results 250A, 250B and 250C in portion 245, where results 250A, 250B, and 250C each represents a specific product that may be responsive to the user's submitted search query. In some embodiments, each of the search results 250A, 250B, and 250C may be associated with a different item category or browse node. In other embodiments, the results 250A, 250B, and 250C may instead all be associated with the same item category, type, or browse node.

Portion 215 of user interface 200 may comprise a list of item categories and browse nodes or subcategories related to the submitted search query. For example, portion 215 may display item category 220A, corresponding to the "Novelty & More" item category, in response to the user-submitted search query of "women's leggings." Similarly, item categories 220B, 220C, and 220D may also be displayed in portion 215. In some embodiments, the displayed item categories 220A, 220B, 220C, and 220D may be associated with one or more of the products displayed in portion 245. For example, result 250A, "Printed Fashion Leggings for Women," may be connected to the "Women's Fashion" item category. In some embodiments, portion 215 may also display subcategories or browse nodes under relevant item categories. For example, user interface 200 may display subcategories or browse nodes 240A and 240B under item category 220D "Sports & Fitness." The displayed browse nodes may be associated with one or more items displayed in portion 245. For example, result 250B "Women's Workout Leggings" may be categorized under browse node 230B "Women's Activewear." In some embodiments, individual categories displayed in portion 215 may be associated in the retail server system with the search query without necessarily having any items within those categories included in the displayed item search results in portion 245.

Figure 3:
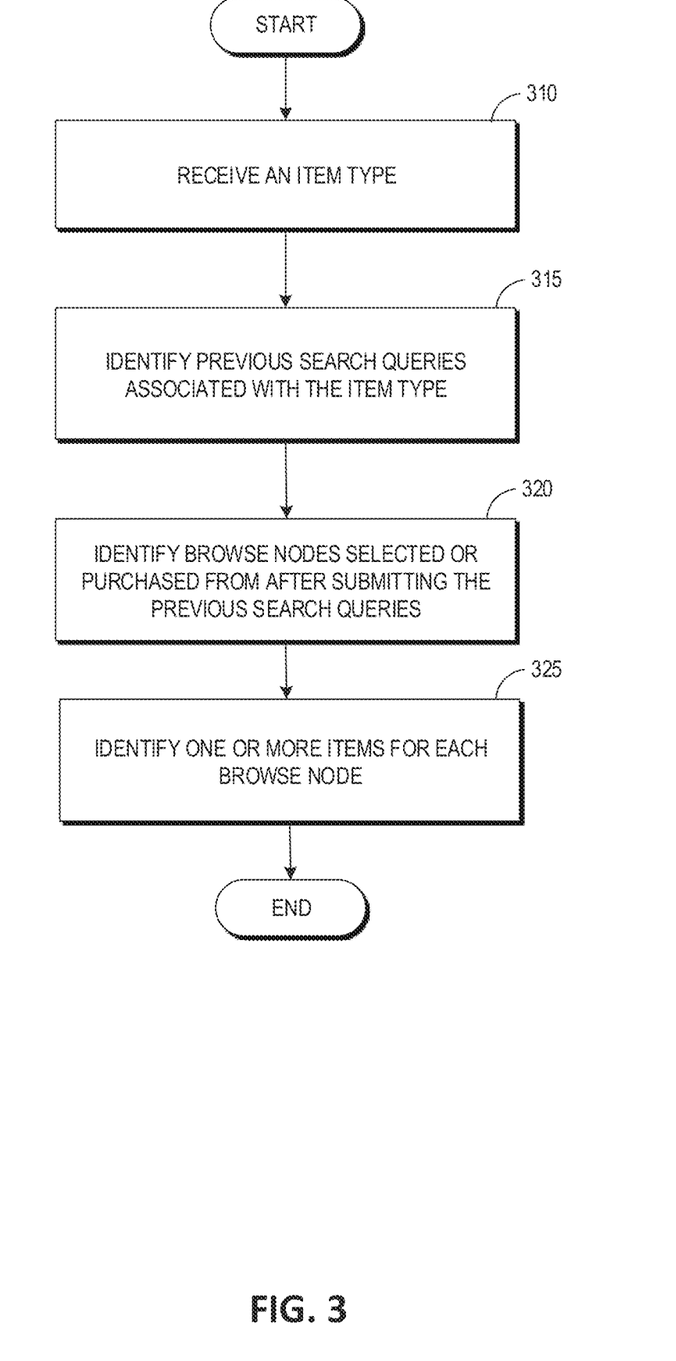
FIG. 3 is a flow diagram depicting an example method of generating or selecting a subset of items and item types to be considered in node or type ambiguity analysis, according to some embodiments.

FIG. 3 is a flow diagram depicting an example method of generating or selecting a subset of items and item types, according to some embodiments, to be considered in node or type ambiguity analysis. Type ambiguity detection system 120 may first receive an item type in block 310. For example, among the plurality of item types present in an electronic catalog, the type ambiguity detection system may initiate the illustrative type ambiguity detection method by analyzing the first item type in an ordered list (e.g., alphabetical order) of item types. In some embodiments, the item type may be the item type associated with the most clicks, selections, or searches by users within a predetermined time frame (e.g., the past 3 months). In some embodiments, the received item type may instead correspond to the item type associated with the most number of purchased products. For example, if 60% of all product purchases over the last 10 days were products associated with the "Clothing" item type or category, then "Clothing" may be the received item type. In some embodiments, the item type may instead be received randomly from the retail server system 116. Although the method in FIG. 3 begins by determining an item type, it will be appreciated that the type ambiguity detection method does not necessarily need to begin by receiving an item type.

In block 315, type ambiguity detection system 120 may identify customer search queries related to the item type. For example, given an item type of "Clothes," the type ambiguity detection system may examine previously submitted search queries and determine which search queries with the keyword "clothes" or "clothing" related keyword leads to the most purchases (e.g., "women's clothes," "winter clothes," "hiking clothes," etc.). In some embodiments, the list of search queries may be narrowed or filtered to only a certain number of most popular related search queries, the queries that had the most subsequent browse or purchase activity, and/or based on other factors.

In block 320, the type ambiguity detection system may identify a plurality of browse nodes for each search query in the identified search queries. In some embodiments, the plurality of browse nodes may comprise browse nodes that customers end up purchasing from after submitting the given query. In some embodiments, the type ambiguity detection system may identify which browse nodes customers end up purchasing from by calculating an affinity score for each search query. Affinity scores may be used to quantify how exhaustive a browse node is for a given search query. For example, the affinity score for a search query q to a node n may be a value between 0 and 1 computed from past customer behavior. A higher affinity score (e.g., 0.9) may indicate that a higher proportion of items associated with a browse node are relevant to the search query. When nodes have distinguishable products, search queries associated with the nodes may have higher affinity scores. In contrast, when multiple nodes have similar products, queries associated with the nodes may have low affinity scores (e.g., 0.1). A low affinity score may therefore indicate that customers are unable to distinguish between item types represented by the nodes. In some embodiments, all browse nodes associated with an item category or search query may be identified. For example, if multiple browse nodes associated with a search query have a low affinity score (e.g., 0.15), then the type ambiguity detection system may include all browse nodes in the plurality of browse nodes. In some embodiments, the type ambiguity detection system may determine that a particular set of browse nodes is not ambiguous if only a few browse nodes are associated with a very high affinity score (e.g., 0.9 or more in one embodiment) while the remaining browse nodes are associated with a very low affinity score (e.g., 0.1 or less in one embodiment). Example affinity scores are described below with reference to FIG. 4.

Figure 5:
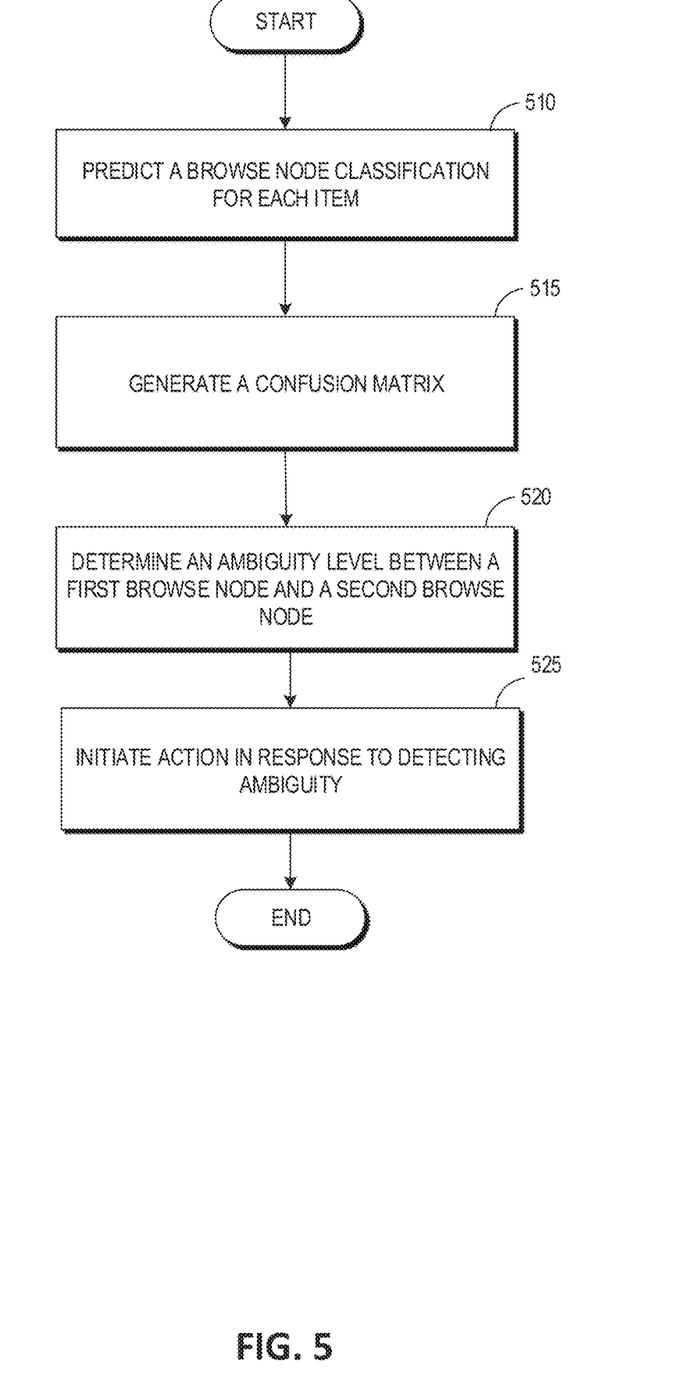
FIG. 5 is a flow diagram depicting an example method of detecting ambiguity between two browse nodes, according to some embodiments.

In block 325, the type ambiguity detection system may identify one or more items for each identified browse node. In some embodiments, the type ambiguity detection system may obtain the most-viewed items in every node and represent them using an average of global vector representation of the item's titles, bullet points, and product descriptions. In some embodiments, the type ambiguity detection system may identify the items within each node that are associated with the most purchases within a given time frame (e.g., the past 2 weeks). In other embodiments, the type ambiguity detection system may begin selecting the items of the browse node in order (such as in numeric or alphabetical order of values for a given field, such as item name or item identifier) for consideration in node ambiguity analysis. Once nodes and associated items have been selected or identified, the selected or identified nodes and associated item information may be used in illustrative method 500, discussed below.

Figure 4:
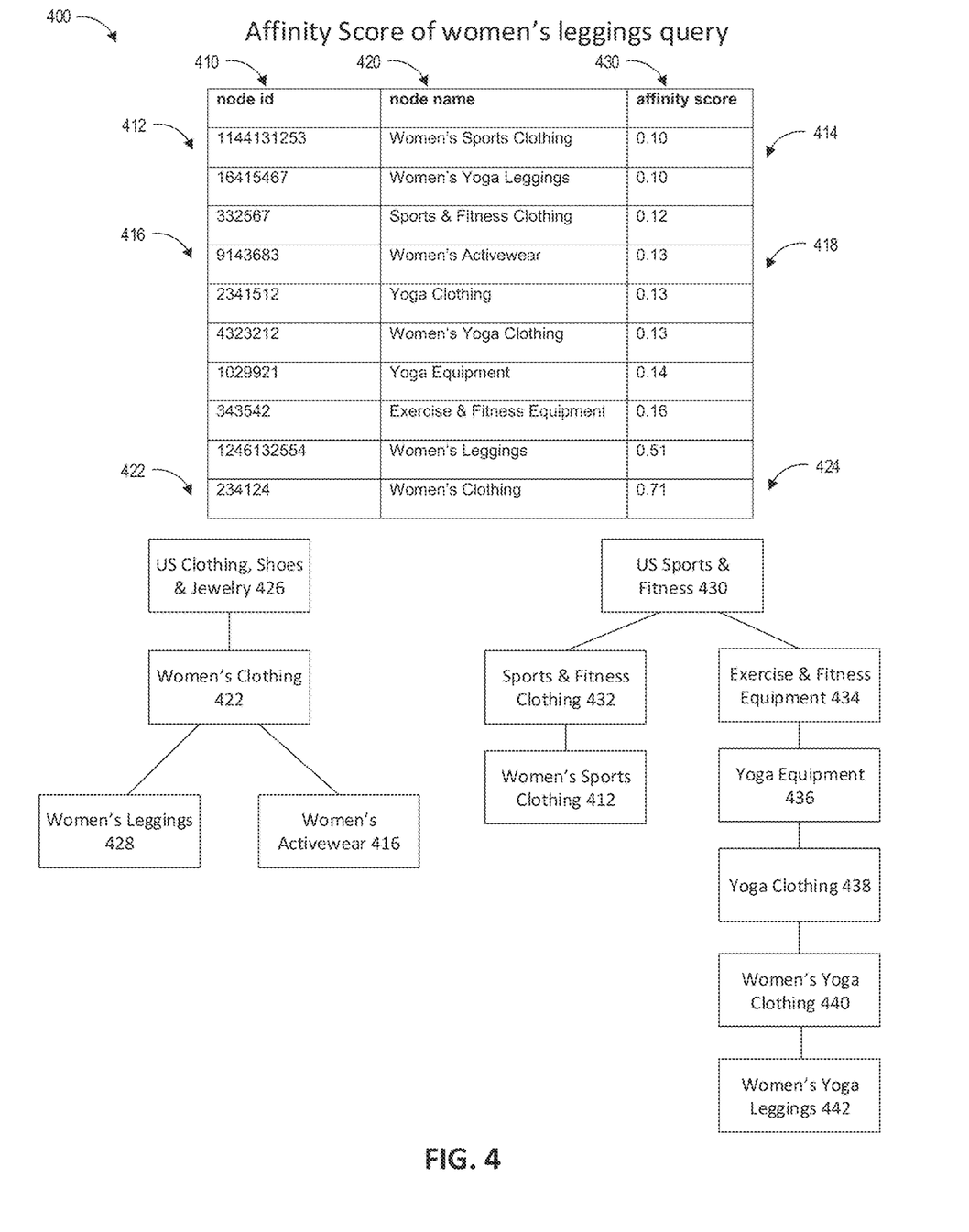
FIG. 4 is a visual representation of an example list of browse nodes and affinity scores used by the type ambiguity detection system, according to some embodiments.

FIG. 4 provides a visual representation of an example list of nodes and associated affinity scores. Table 400 comprises node id column 410, node name column 420, and affinity score column 430. Given a search query of "women's leggings," node 412 "Women's Sports Clothing" is associated with score 414 of 0.10, node 416 "Women's Activewear is associated with score 418 of 0.13, and node 422 "Women's Clothing" is associated with score 424 of 0.71. The low values of score 414 and score 418 may indicate that a low amount of items responsive to the search query were found in nodes 412 and 416 or that customers have historically been unable to distinguish the browse nodes. Table 400 may include additional nodes that are associated with low affinity scores. Therefore, the type ambiguity detection system may select all browse nodes in the table to include in the plurality of browse nodes to be further analyzed for ambiguity (e.g., for checking pairwise ambiguity between individual pairings of the nodes).

Although table 400 lists a plurality of nodes in a table format, it will be appreciated that browse nodes may be ordered in a hierarchical relationship. For example, as illustrated in the tree structure of FIG. 4, the US Clothing, Shoes & Jewelry node 426 may be a parent node of the Women's Clothing node 422. Browse node 422 may itself be a parent node of Women's Leggings node 428 and Women's Activewear node 416 (also illustrated in table 400), which may each represent particular subcategories of items categorized under the Women's Clothing node 422. Similarly, node 430 may represent a US Sports & Fitness item category, which may include "Sports & Fitness Clothing node 432 and Exercise & Fitness Equipment node 434. Both node 432 and node 434 may each comprise one or more sub-nodes in the hierarchy. For example, node 432 may include Women's Sports Clothing node 412. On the other hand, node 434 may reference a linear hierarchy of nodes comprising Yoga Equipment node 436, Yoga Clothing node 438, Women's Yoga Clothing node 440, and Women's Yoga Leggings node 442, wherein each subsequent level in the hierarchy may comprise increasingly specific nodes or items. As discussed above, each node may be associated with a particular affinity score. In some embodiments, the affinity score of a browse node may be greater than or equal to affinity scores of nodes lower in the hierarchy. For example, while node 428 may be associated with an affinity score of 0.51 and node 416 may be associated with an affinity score of 0.13, the affinity score of the Women's Clothing browse node 422 may be 0.71.

FIG. 5 is a flow diagram depicting an example method of ambiguity detection given a set of items and item types, according to some embodiments. The set of items and/or browse nodes considered in method 500 may be determined based on methods discussed above with respect to FIG. 4. In block 510, the type ambiguity detection system may predict an appropriate browse node for each item. As discussed above, the type ambiguity detection system may do so by first generating a classifier via classifier module 160. In some embodiments, the classifier module 160 may generate a gradient boosted decision tree (GBDT) based classifier to build a multi-class classifier. In some embodiments, the generated classifier may take as input an individual item and classes or browse nodes in which to classify the item. In some embodiments, the input item may be transformed into a representative vector. For example, in some embodiments, the classifier module may generate a representative vector for an item using average GloVe embedding of the text associated with the item, such as titles, bullet points, and descriptions. It will be appreciated that in some embodiments, other algorithms may be used to obtain vector representations for words (e.g., word2vec algorithm).

In some embodiments, the classifier may be tuned to achieve a certain level of performance. For example, GBDT hyper-parameters (e.g., maximum depth of a tree, maximum number of terminal nodes in a tree) may be tuned using 10-fold cross validation with area under curve (AUC) as the evaluation criterion. In some embodiments, the classifier may then compute a prediction score of each product identified by the browse node module 150 for each class or browse node determined by the browse node module 150. In some embodiments, the prediction score of an item belonging to a certain class may be predicted by utilizing arguments of the maxima function. For example, for an item $s_i$, the predicted class of the item $s_i$ may be represented as bn*=arg max$_j p_{ij}$, where $p_{ij}$ is the prediction score representing the probability that the item $s_i$ belongs to browse node $b_{nj}$.

The GBDT may be trimmed to reduce the overall size and complexity of the model. For example, the type ambiguity detection system may compute a probability threshold for alpha-trimming and remove an item from the identified set of items if that item the probability of that item belonging to a particular class is below a predetermined threshold (e.g., 0.05 on a scale of 0 to 1). Therefore, a new set of items to be used in the type ambiguity detection system may include only the items associated with a probability score exceeding the predetermined threshold, and the classifier may be retrained using the new set of items. In some embodiments, the type ambiguity detection system may then refit the GBDT classifier with the new set of items on the same classes or browse nodes previously identified by the browse node module 150.

In block 515, the type ambiguity detection system may generate a confusion matrix to evaluate the prediction results of the GBDT classifier. In some embodiments, the type ambiguity detection system may compute a confusion matrix as:

$$\begin{array}{c} \phantom{bn_1} \begin{array}{cccc} bn_1 & bn_2 & \ldots & bn_n \end{array} \\ \begin{array}{c} bn_1 \\ bn_2 \\ \vdots \\ bn_n \end{array} \left( \begin{array}{cccc} x_{11} & x_{21} & \ldots & x_{n1} \\ x_{12} & x_{22} & \ldots & x_{n2} \\ \vdots & \vdots & \ddots & \vdots \\ x_{1n} & x_{2n} & \ldots & x_{nn} \end{array} \right) \end{array}$$

where $x_{ij}$ is the number of samples or items belonging to browse node $bn_i$ but predicted to be in browse node $bn_j$.

In block 520, the classifier module 160 may use the entries of the confusion matrix to calculate ambiguity between two browse nodes. For example, in some embodiments the ambiguity between browse node $bn_p$ and $bn_q$ may be defined as:

$$\lambda_{pq} = +\frac{x_{pq} + x_{qp}}{x_p + x_q}$$

where $x_{pq}$ represents the number of items belonging to browse node p but predicted to be in browse node q, $x_{qp}$ represents the number of items belonging to browse node q but predicted to be in browse node p, $x_p$ represents the number of items in node p, and $x_q$ represents the number of items belonging in node q. In some embodiments, $\lambda_{pq}$ may be a value between 0 and 1, where higher values of $\lambda_{pq}$ may denote higher ambiguity between browse node p and browse node q. Advantageously, computing the ambiguity between browse nodes may in turn lead to a determination of overall ambiguity of the item type, category, or concept associated with the browse nodes. For example, if two browse nodes (e.g., "sweaters" and "shirts") are determined to have a high ambiguity score (e.g., 0.9 on a scale from 0 to 1), associated with a broader item category (e.g., "Clothes"), then it may be determined that the item category itself is ambiguous, especially if the number of items in the ambiguous browse nodes is large.

In block 525, the type ambiguity detection system may initiate an action in response to predicting ambiguity between two nodes. In some embodiments, the type ambiguity detection system may transmit a notification to an administrator of retail server system 116 if the type ambiguity detection system detects ambiguity between two nodes. For example, the type ambiguity detection system may transmit a text message, e-mail message, or push notification alerting the administrator that two specific browse nodes have been predicted to be ambiguous. In some embodiments, the transmitted message may also include a recommendation to take a certain action. For example, the type ambiguity detection system may transmit an e-mail message to an administrator account (or a message delivered within an administrative user interface) indicating that two nodes have been predicted to be ambiguous and that the administrator should consider removing one node from the electronic catalog to avoid confusion. In some embodiments, the type ambiguity detection system may recommend a user remove a node, relocate a node to a different item type or category, add a node, or merge two nodes together. In some embodiments, the type ambiguity detection system may automatically initiate an action without necessarily transmitting a notification or waiting for user input. For example, if the type ambiguity detection system predicts that a first browse node and a second browse node are ambiguous, then the type ambiguity detection system may automatically merge the first and second browse nodes together. After merging, in some embodiments, the type ambiguity detection system may place the merged node in one of the two original locations in the browse tree and add an alias or pointer to the merged node in the other of the two original locations (such that the merged node effectively becomes shared between two parent nodes).

Figure 6:
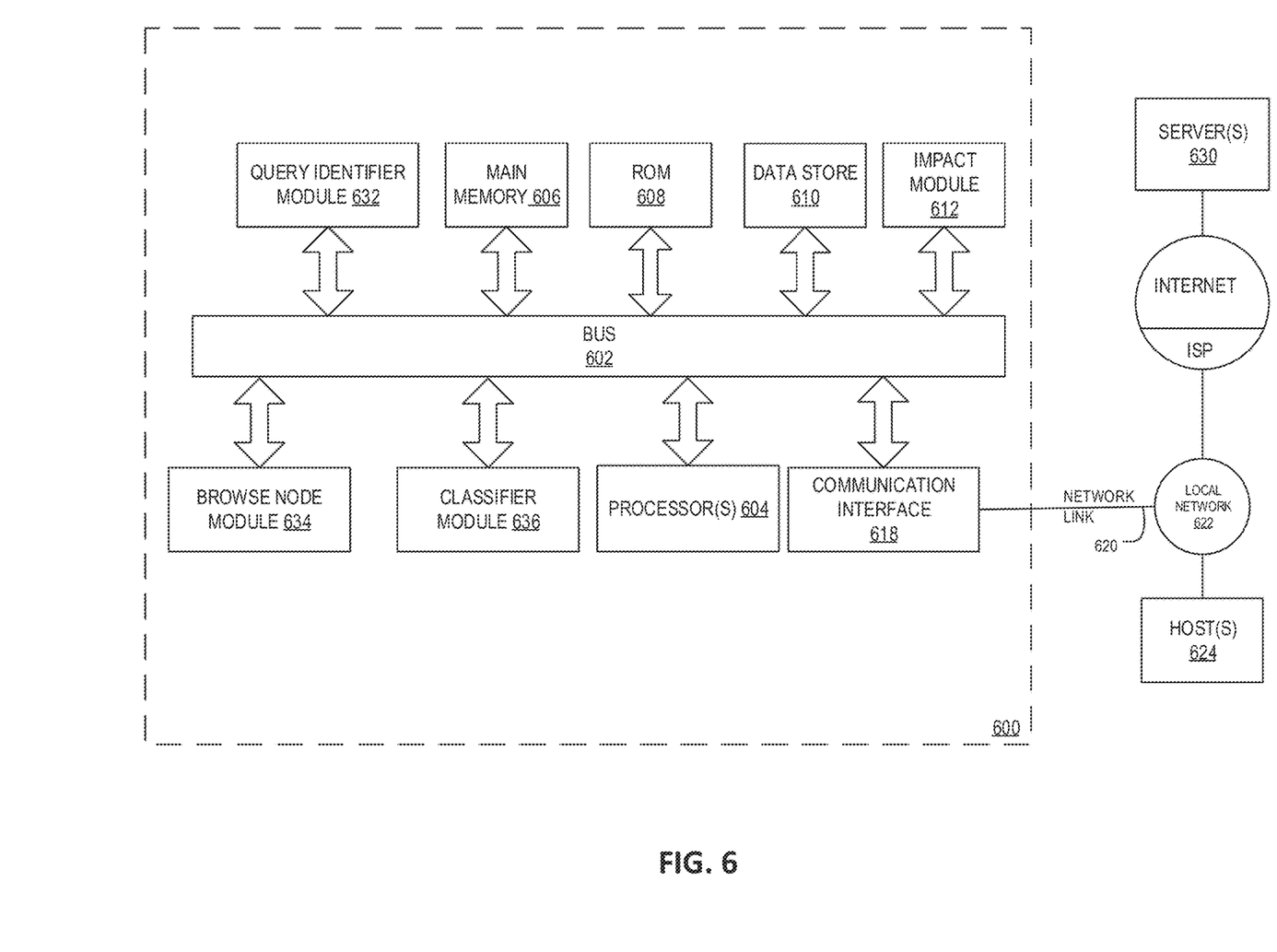
FIG. 6 is a diagram of an example computing system configured to perform type ambiguity detection described herein.

FIG. 6 is a block diagram of an illustrative computing system that may implement one or more of the features described. The computing system 600 may be configured to perform all or some of the features of the type ambiguity detection system 120. The computing system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

The computing system 600 also includes a main memory 606, such as a random access memory (RAM), cache, or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render the computing system 600 into a special-purpose machine that is customized to perform the operations specified in the instructions.

The computing system 600 further includes a read only memory (ROM) 608 or other static storage device coupled to bus 602 for storing static information and instructions for processor 604. Storage device 610, such as a magnetic disk, optical disk, or USB thumb drives (Flash drives), etc., is provided and coupled to bus 602 for storing information and instructions.

The computing system 600 may further, as described below, implement the techniques described herein using customized hard-wired logic, one or more application specific integrated circuits (ASICs) or field programmable gate arrays (FPGAs), firmware and/or program logic which in combination with the computer system causes or programs the computing system 600 to be a special-purpose machine. According to one embodiment, the techniques herein may be performed by the computing system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

As part of a special-purpose machine, the computing system 600 may include query identifier module 632, browse node module 634, classifier module 636, and impact module 612. According to one embodiment, query identifier module 632 may track how frequently a term has appeared in previously submitted search queries and which item type, label, or item category is mapped to the term in the online catalog. In some embodiments, browse node module 634 may determine a set of two or more browse nodes or item subcategories. In some embodiments, classifier module 636 may generate a classifier to perform type ambiguity detection, compute a confusion matrix and evaluate ambiguity between two nodes. In some embodiments, the impact module 612 may transmit a notification that two nodes may be ambiguous and may recommend an action in response to the detected ambiguity. In some embodiments, the impact module 612 may automatically initiate an action in response to detecting ambiguity among browse nodes. According to one embodiment, instructions may be transmitted through communication interface 618 to one or more servers 630. The instructions transmitted may be stored in ROM 608 in one embodiment.

Various forms of computer readable storage media may be involved in carrying one or more sequences of one or more computer readable program instructions to processor 604 for execution. For example, the instructions may initially be carried on a magnetic disk or solid state drive of a remote computer. The bus 602 may carry data to main memory 606, from which processor 604 retrieves and executes the instructions.

The computing system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the Internet 628 to a server 630.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a c system, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A type ambiguity detection system can be or include a microprocessor, but in the alternative, the type ambiguity detection system can be or include a controller, microcontroller, or state machine, combinations of the same. A type ambiguity detection system can include electrical circuitry configured to process computer-executable instructions. Although described herein primarily with respect to digital technology, a type ambiguity detection system may also include primarily analog components. For example, some or all of the prediction algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a type ambiguity detection system, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the type ambiguity detection system such that the type ambiguity detection system can read information from, and write information to, the storage medium. In the alternative, the storage medium can be integral to the type ambiguity detection system. The type ambiguity detection system and the storage medium can reside in an ASIC. The ASIC can reside in a user terminal. In the alternative, the type ambiguity detection system and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
a memory storing computer-executable instructions; and
one or more hardware processors in communication with the memory and configured by the executable instructions to at least:
 identify an item type associated with a subset of items in an electronic catalog;
 identify a plurality of previous search queries related to the item type, wherein the plurality of previous search queries are associated with requests from users to search for items in the electronic catalog;
 determine a plurality of browse nodes that are associated with one or more of the plurality of previous search queries, wherein individual browse nodes in the plurality of browse nodes contain one or more items, wherein an individual browse node in the plurality of browse nodes includes at least one item that has been previously selected or purchased by at least one user after the at least one user submitted at least one of the previous search queries;
 identify, for an individual browse node in the plurality of browse nodes, a subset of items based at least partly on user behavior after submitting previous search queries, wherein an individual item in the subset of items is associated with item data comprising an item title and an item description;
 determine, for an individual item in the subset of items, a browse node classification for the individual item using a classifier trained to predict browse node classification for an input item;
 generate a confusion matrix configured to evaluate an ambiguity level between at least two browse nodes based at least partly on the determined browse node classification for individual items in the subset of items;
 determine the ambiguity level between a first browse node and a second browse node in the plurality of browse nodes based at least in part on the confusion matrix;
 determine that the ambiguity level between the first browse node and the second browse node exceeds a predetermined threshold value; and
 merge the first browse node and the second browse node based on the ambiguity level exceeding the predetermined threshold value.

2. The system of claim 1, wherein the first browse node and the second browse node are merged automatically.

3. The system of claim 1, wherein the plurality of previous search queries are associated with requests from users to search for items in the electronic catalog in a predetermined time frame.

4. A system comprising:
a memory storing computer-executable instructions; and
one or more hardware processors in communication with the memory and configured by the executable instructions to at least:
 determine a plurality of browse nodes, wherein an individual browse node is associated with a subset of items in an electronic catalog;
 determine, using a classifier configured to predict a browse node classification associated with an input item, a browse node classification for an item of a plurality of items, wherein the plurality of items include items from individual browse nodes of the plurality of browse nodes;
 determine an ambiguity level between a first browse node and a second browse node of the plurality of browse nodes, wherein the ambiguity level is based at least in part on a number of items currently associated with the first browse node that were predicted by the classifier to be associated with the second browse node;
 determine that the ambiguity level between the first browse node and the second browse node exceeds a predetermined threshold value; and
 initiate a responsive action associated with at least one of the first browse node or the second browse node based on the ambiguity level exceeding the predetermined threshold value.

5. The system of claim 4, wherein the plurality of browse nodes are determined based at least in part on previous search queries identified from a historical log of user search queries.

6. The system of claim 4, wherein item data provided to the classifier comprises alphanumeric text.

7. The system of claim 6, wherein item data associated with an individual item is transformed into a vector representation of the item data that is provided as input data to the classifier.

8. The system of claim 4, wherein the plurality of browse nodes is determined by calculating an affinity score for a browse node.

9. The system of claim 8, wherein the affinity score is calculated based at least in part on a proportion of items associated with the browse node that are relevant to a search query.

10. The system of claim 4, wherein the one or more hardware processors are further configured to generate a confusion matrix, wherein an entry in the confusion matrix denotes a number of items belonging to one browse node in the plurality of browse nodes but predicted to belong to another node in the plurality of browse nodes.

11. The system of claim 4, wherein the ambiguity level between the first browse node and the second browse node is determined by:

$$\lambda_{pq} = \frac{x_{pq} + x_{qp}}{x_p + x_q}$$

wherein $x_{pq}$ represents the number of items belonging to the first browse node but predicted to be in the second browse node, $x_{qp}$ represents the number of items belonging to the second browse node but predicted to be in the first browse node, $x_p$ represents the number of items in the first browse node, and $x_q$ represents the number of items belonging in the second browse node.

12. The system of claim 4, wherein items provided to the classifier are selected based at least in part on prior user behavior, wherein the prior user behavior comprises user selection of a browse node, user selection of an item, or user selection of an item type within a user interface.

13. The system of claim 4, wherein the responsive action comprises transmitting a notification recommending that the first browse node and the second browse node be at least one of merged, moved, removed, or added in the electronic catalog.

14. The system of claim 4, wherein the responsive action comprises automatically merging, moving, removing, or adding the first browse node and the second browse node in the electronic catalog.

15. A computer-implemented method comprising:
 determining a plurality of browse nodes, wherein an individual browse node in the plurality of browse nodes is associated with a subset of items in an electronic catalog;
 determining, using a classifier configured to predict a browse node classification associated with an input item, a browse node classification for an individual item of a plurality of items, wherein the plurality of items include items from individual browse nodes of the plurality of browse nodes;
 determining an ambiguity level between a first browse node and a second browse node of the plurality of browse nodes, wherein the ambiguity level is based at least in part on a number of items currently associated with the first browse node that were predicted by the classifier to be associated with the second browse node;
 determining that the ambiguity level between the first browse node and the second browse node exceeds a predetermined threshold value; and
 initiating a responsive action associated with at least one of the first browse node or the second browse node based on the ambiguity level exceeding the predetermined threshold value.

16. The method of claim 15, further comprising transmitting a notification to a user regarding the responsive action.

17. The method of claim 15, wherein the predetermined threshold value is adjustable by a user.

18. The method of claim 15, wherein the responsive comprises merging the first browse node and the second browse nodes together.

19. The method of claim 15, wherein the ambiguity level between the first browse node and the second browse node is a numeric value.

20. The system of claim 15, wherein the classifier is a gradient boosting decision tree.

\* \* \* \* \*